Figure 1:
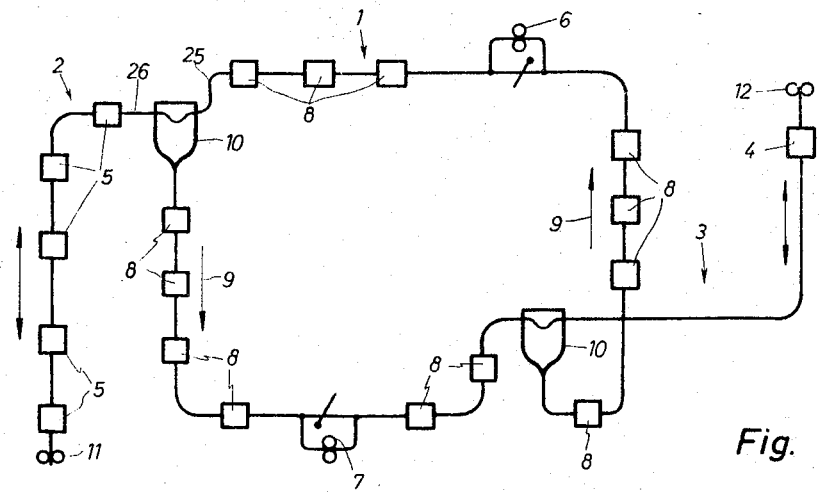

Aug. 9, 1966    H. MACH ETAL    3,265,326

PNEUMATIC TUBE SYSTEM SWITCHING POINTS

Filed May 26, 1964

INVENTORS
HORST MACH
HANS-JOACHIM PETER

BY Percy P. Lankey

ATTORNEY

United States Patent Office 3,265,326
Patented August 9, 1966

1

3,265,326
PNEUMATIC TUBE SYSTEM SWITCHING POINTS
Horst Mach and Hans-Joachim Peter, both of Berlin, Germany, assignors to International Standard Electric Corporation, New York, N.Y., a corporation of Delaware
Filed May 26, 1964, Ser. No. 370,304
Claims priority, application Germany, June 20, 1963, St 20,756
6 Claims. (Cl. 243—29)

This invention relates to a pneumatic tube system and, more particularly, to a switching point for connecting a circular pneumatic tube system to a single tube reversing pneumatic tube system.

Circular type pneumatic tube systems consist of systems in which all the pneumatic tube stations are connected to a pneumatic tube loop. The carriers in the system are advanced in only one direction along the loop. After a carrier is dispatched by one station, it moves in the direction of the system around the loop until it reaches its destination station. If the destination station is adjacent to the dispatch station, but opposite in direction to that of the pneumatic tube system, the carrier will traverse almost the entire tube loop before reaching its destination. Such systems are economically used in small buildings.

It is often desirable to provide a combination pneumatic tube system by connecting a circular system to a single tube reversing system. A single tube reversing system is one consisting of a forwarding tube through which carriers can be sent in either direction to stations connected into the forwarding tube. Of course, the carriers in the tube can only travel in one direction at a time. One example when such a combination system is used, is when a circular pneumatic tube system in one building is connected to stations in another building and it is not economical to provide the return loop needed to include the other building in said circular system.

Switching arrangements are needed to connect the circular systems to the reversible systems. These arrangements are called "switching points." Present switching points are so complicated and expensive that they tend to make the entire system uneconomical.

It is an object of this invention to provide a switching point which is inexpensive and simple in construction for switching either between circular and reversible pneumatic tube systems or between circular systems.

One feature of our invention is the provision of a switching point comprising connecting means normally completing a first pneumatic tube route between first and second sections of pneumatic tubing, ejecting means which cooperate with the connecting means to eject desired carriers traveling through the connecting means in either direction out of the first pneumatic tube route, and guide means cooperating with the connecting means and a third section of pneumatic tubing which receives the ejected carriers and guides them into the third section of tubing positioned for travel along the third section of tubing in a first desired direction regardless of the directions of travel of the carriers through the first pneumatic tube system.

Figure 2:
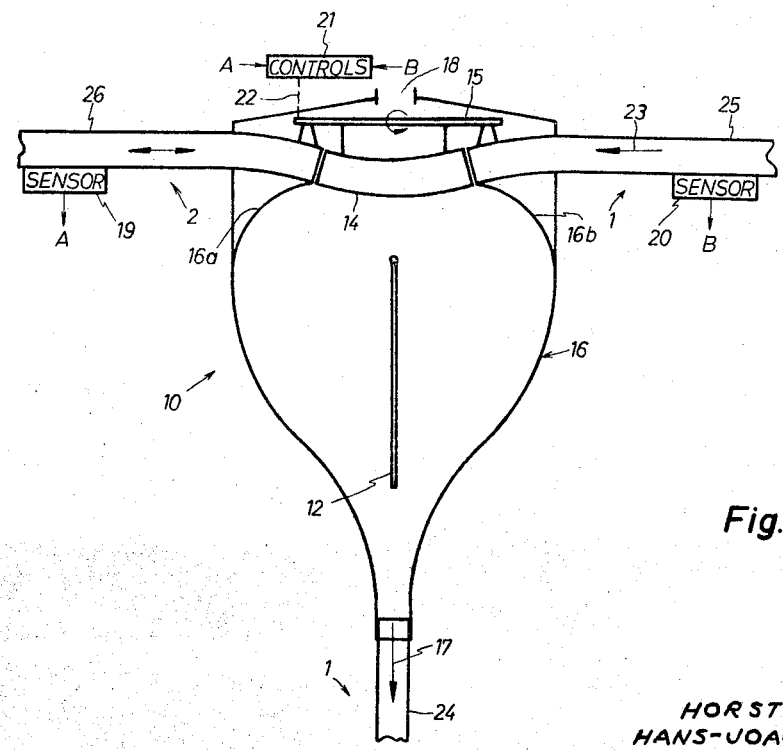

The above-mentioned and other features and objects of this invention will become more apparent by reference to the following description taken in conjunction with the accompanying drawings, in which:

FIGURE 1 is a schematic illustration of a combined circular and reversible tube system utilizing switching points in accordance with our invention; and FIGURE 2 is a schematic drawing of a switching point in accordance with our invention.

FIGURE 1 schematically illustrates a combined pneu-

2 matic tube system in which a circular system 1 is combined with two reversible systems 2 and 3. Such a combined system may be utilized, for example, where circular system 1 is contained in one building, reversible system 3 connects system 1 to a pneumatic tube station 4 in a garage situated a goodly distance away from the building, and reversible system 2 connects system 1 to an adjacent building containing a plurality of pneumatic tube stations 5. Circular system 1 comprises blowers 6 and 7 and dispatching and receiving stations 8. Carriers travel through system 1 in the direction indicated by arrows 9. System 1 is connected to reversible systems 2 and 3 via switching points 10 in accordance with our invention. Reversible blowers 11 and 12 serve systems 2 and 3, respectively.

In order to adapt the reversible and circular systems to one another, we have provided a switching point 10 (FIG. 2) consisting of a movable connecting means, tubing 14, connecting the circular system to each reversible system. Ejector means 15 for moving the connecting means operates to eject a carrier traveling in either direction through connecting means 14 into cooperating receiver means 16 which discharges carriers into branch 24 of the system 1 headed in the direction of arrow 17 regardless of their previous directions of travel. System 1 is directly connected to system 2 via the bent section of tubing 14. A more detailed explanation of one type of connecting and ejecting means can be found in the U.S. patent application of K. Suhr, Ser. No. 281,878.

Tubing 14 is supported by ejecting means for pivotal movement into coaxial relationship with the forwarding tubes 25, 26 of systems 1 and 2, respectively, or completely away therefrom. It can be seen that if a carrier is to be sent from system 1 to system 2 it will pass directly through connecting means 14. If a carrier is now to be passed from system 2 to system 1 or from section 25 of system 1 to section 24 of system 1, the ejecting means will discharge the carrier into funnel-shaped receiving or guiding means 16 which guides the carriers to face in the direction of arrow 17 regardless of the direction from which the carriers are received. Damping means 12, consisting of a piece of leather, or rubber, or similar material, may be used to damp the impact of the dispatch carriers on the inside of the funnel.

The funnel and tube ends can be vacuum sealed so that little pneumatic change occurs through the switching point. This would require tube flaps in the various drive tubes to pneumatically separate systems 1, 2, and 3. To save cost, the switching point may be placed at the connection of the pneumatic tube systems with the atmosphere, which connection is necessary in all pneumatic tube systems. Thus, if connection 18 to the atmosphere establishes a zero (atmosphere pressure) point for the system, the need for vacuum sealing of the switching point will be eliminated. The overall system can utilize conventional means for insuring that only one carrier enters a switching point at a time.

The operation of the switching point will now be explained with particular reference to FIGURE 2. Whenever sensor 19 senses carriers moving from system 2 toward switching point 10 it emits a pulse A. Pulse A causes control means 21 to operate ejecting means 15 via the schematically illustrated connecting link 22 so that bent section 14 is moved out of coaxial relationship with forwarding tubes 25 and 26. Thus, all carriers moving toward the switching point from system 2 are ejected into receiver or guide means 16 and guided via the funnel-shaped portion thereof into tube 24 positioned for travel in the direction indicated by arrow 17. It is not always important that the carriers face in the direction of arrow 17; however, all carriers will face in that direction due to the cooperation of portions 16a and 16b of the funnel with systems 1 and 2, respectively. Each portion, 16a or 16b, will guide the carriers along their respective curves to tube 24 for travel in the direction of arrow 17.

Carriers traveling in the direction of arrow 23 are sensed by sensor 20 which comprises means for detecting the destination of the carrier and means for producing a pulse B whenever the destination of the carrier is one of the stations 8 of circular system 1 or station 4 or reversible system 3. Pulse B causes control means 21 to operate ejector 15 so that carriers destined for stations 8 or 4 will be ejected into the receiving means and guided into tube 24 for travel in the direction indicated by arrow 17. Carriers destined for stations 5 will pass through the connecting means to their respective destinations. It is to be noted that our switching points can be used for connecting either two circular systems or two reversible systems to each other as well as a circular to a reversible system.

While we have described the principles of our invention in connection with specific apparatus, it is to be clearly understood that this description is made only by way of example and not as a limitation to the scope of our invention as set forth in the accompanying claims.

We claim:

1. A switching point for a pneumatic tube system comprising: first, second, and third sections of pneumatic tubing; connecting means normally completing a pneumatic tube route between said first and said second sections of tubing; means cooperating with said connecting means for ejecting desired carriers out of said pneumatic tube route; and guide means characterized by symmetry with respect to said first and said second sections of tubing and cooperating with said connecting means and said third section of tubing for guiding ejected carriers from either end of said tube route into said third section of tubing in a desired position with respect to said third section of tubing for travel therealong.

2. A switching point according to claim 1 wherein said guide means comprises funnel-shaped receiving means and damper means for damping the impact of received carriers within said receiving means.

3. A switching point according to claim 1 wherein said connecting means comprises a bent section of tubing and means normally supporting said bent section of tubing in coaxial relationship with said first and second sections of tubing.

4. A switching point according to claim 3 wherein said ejecting means comprises means for moving said bent section of tubing completely out of alignment with said first and second sections of tubing.

5. A switching point according to claim 4 wherein said guide means comprises funnel-shaped receiving means which cooperate with said first and second sections of tubing to guide ejected carriers from said first pneumatic tube route which is adjacent the large end of the funnel to the neck of the funnel which leads into said third section of tubing.

6. A switching point for a pneumatic tube carrier system comprising: first, second and third sections of pneumatic tubing; connecting means normally completing a first pneumatic tube route between said first and second sections of pneumatic tubing; means cooperating with said connecting means for ejecting desired carriers out of said first pneumatic tube route; guide means cooperating with said connecting means and said third section of tubing for forming a second pneumatic tube route between said first and third sections of pneumatic tubing and a third pneumatic tube route between said second and third sections of tubing comprising means characterized by symmetry with respect to said first and said second sections of pneumatic tubing for guiding ejected carriers into said third section of tubing in a desired position with respect to said third section of tubing for travel therealong; and means disposed adjacent said connecting means for linking said first, second and third pneumatic tube routes with the atmosphere.

References Cited by the Examiner

UNITED STATES PATENTS

| 904,414 | 11/1908 | Earl | 243—31 |
| 2,773,658 | 12/1956 | Van Otteren | 243—1 |

FOREIGN PATENTS

| 674,371 | 1/1930 | France. |
| 1,136,939 | 9/1962 | Germany. |
| 20,468 | 9/1911 | Great Britain. |
| 853,158 | 11/1960 | Great Britain. |

EVON C. BLUNK, *Primary Examiner.*

SAMUEL F. COLEMAN, *Examiner.*

H. C. HORNSBY, *Assistant Examiner.*